United States Patent [19]

Oltrogge

[11] 4,204,702

[45] May 27, 1980

[54] UNIVERSAL QUICK DETACH ACCESSORY MOUNT FOR VEHICLES OR THE LIKE

[76] Inventor: Victor C. Oltrogge, 6054 Queen Ct., Arvada, Colo. 80004

[21] Appl. No.: 935,990

[22] Filed: Aug. 23, 1978

Related U.S. Application Data

[63] Continuation of Ser. No. 654,364, Feb. 2, 1976, abandoned.

[51] Int. Cl.$^2$ .............................................. B60D 1/06
[52] U.S. Cl. ................................ 280/491 E; 280/500
[58] Field of Search .................. 280/495, 497, 491 E, 280/491 R, 491 A, 460 R, 461 R, 456, 500, DIG. 8; 224/42.03 R, 42.03 A, 42.03 B, 42.07, 42.08, 42.32; 248/205 R, 201, 239; 403/157, 158, 159; 339/195 M, 196 M; 293/117

[56] References Cited

U.S. PATENT DOCUMENTS

| | | | |
|---|---|---|---|
| 2,592,050 | 4/1952 | McCharen | 224/42.03 |
| 2,739,293 | 3/1956 | Alden | 339/196 M |
| 2,867,402 | 1/1959 | Graybill et al. | 224/42.03 |
| 2,952,323 | 9/1960 | Orelind | 280/461 A |
| 3,039,634 | 6/1962 | Hobson et al. | 224/42.03 |
| 3,176,903 | 4/1965 | Farley | 224/42.03 B |
| 3,203,604 | 8/1965 | Spence | 224/42.07 |
| 3,741,588 | 6/1973 | Dotterweich | 280/495 X |
| 3,796,333 | 3/1974 | Goldstein | 224/42.03 |
| 3,825,882 | 7/1974 | Tucker | 339/196 M |
| 3,870,340 | 3/1975 | Winter | 280/495 |
| 4,065,009 | 12/1977 | Old | 214/131 A |

Primary Examiner—John A. Pekar
Attorney, Agent, or Firm—John E. Reilly

[57] ABSTRACT

Multiple attachment points for receiving universal adapters are retained by a relatively rigid structure in a generally rectangular orientation. The structure is rigidly attached to a structurally sturdy member such as the underframe of a vehicle. One arrangement of the attachment points employs four slots which are oriented at the effective corners of a rectangle and parallel to the anticipated direction of main tension loading. These slots are arranged to receive extension arms of a bracket-like adapter to which any of a wide variety of accessories can be mounted. For a vehicle, the slot-retaining frame can be rigidly secured to the underframe between the vehicle body and the protective bumper, attached to or included within a surface of the bumper or even mounted upon the flat bed surface of the vehicle body. In yet another arrangement of the mounting points, an arrangement of bars is rigidly secured to a box-like structure which is in turn secured to the vehicle body. A pivotal and slidable clamping arrangement permits engaging of the bars so as to secure the adapter to the vehicle frame.

12 Claims, 30 Drawing Figures

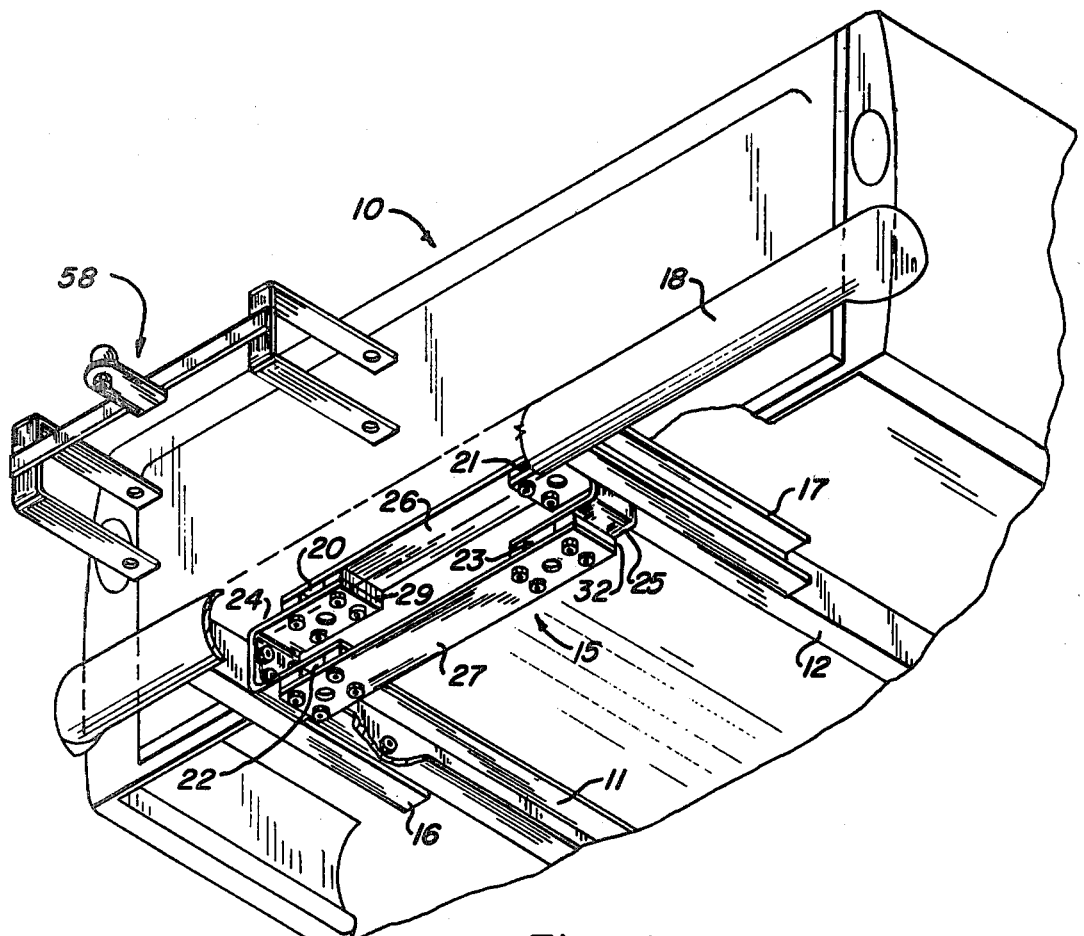
Fig_1
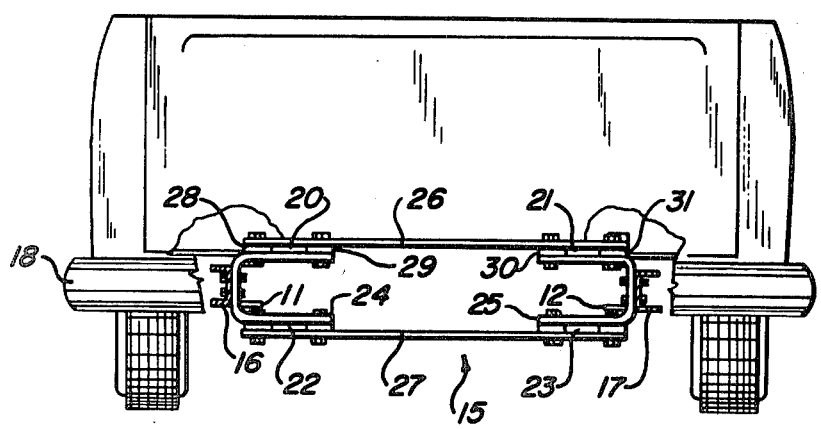
Fig_2

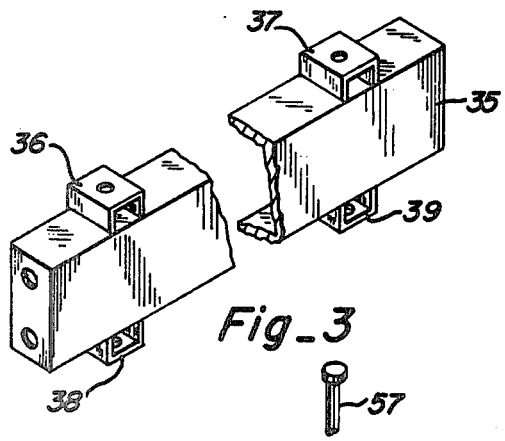
Fig_3
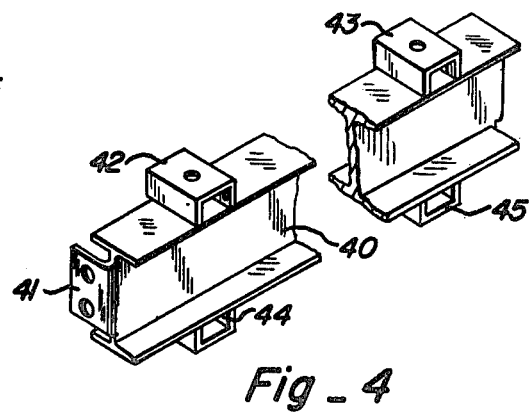
Fig_4
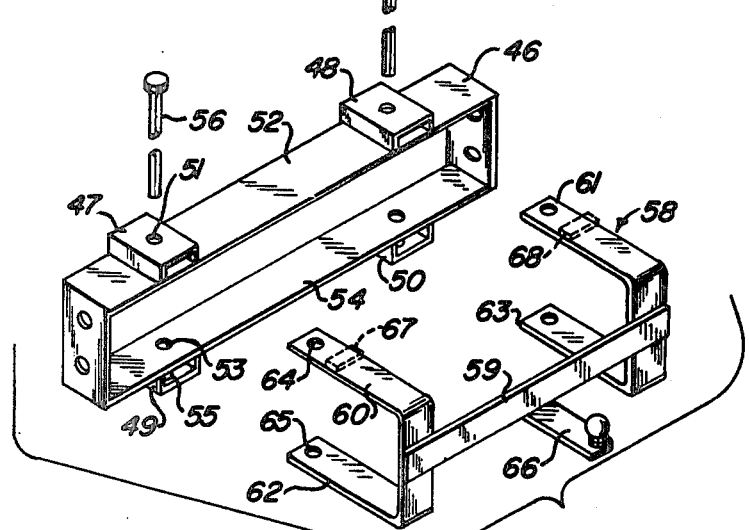
Fig_5
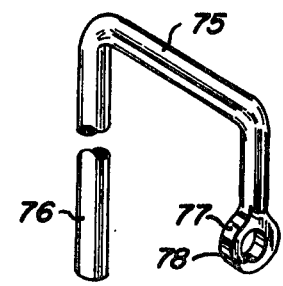
Fig_7
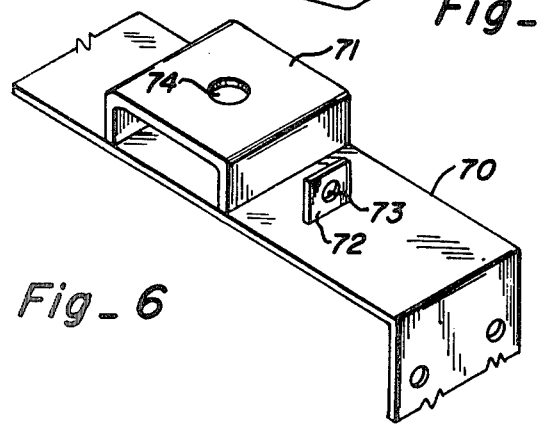
Fig_6
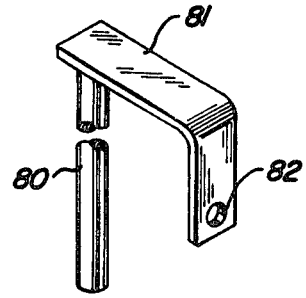
Fig_8

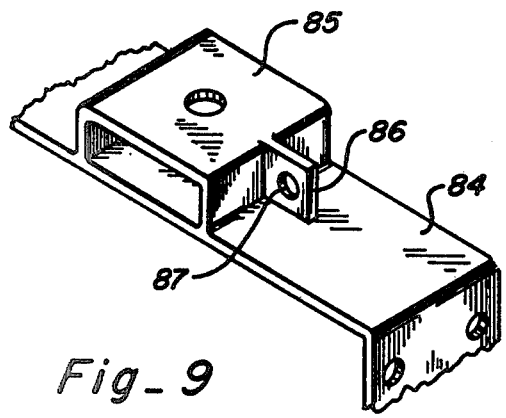
Fig_9
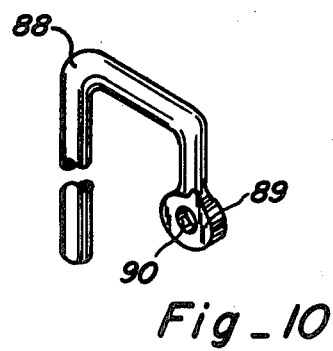
Fig_10
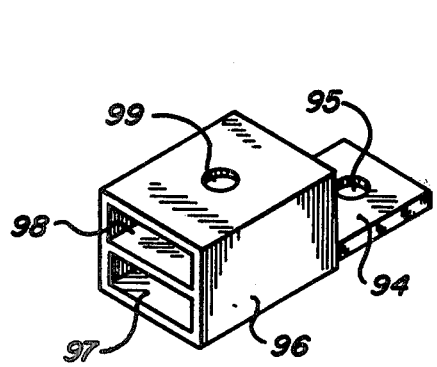
Fig_11
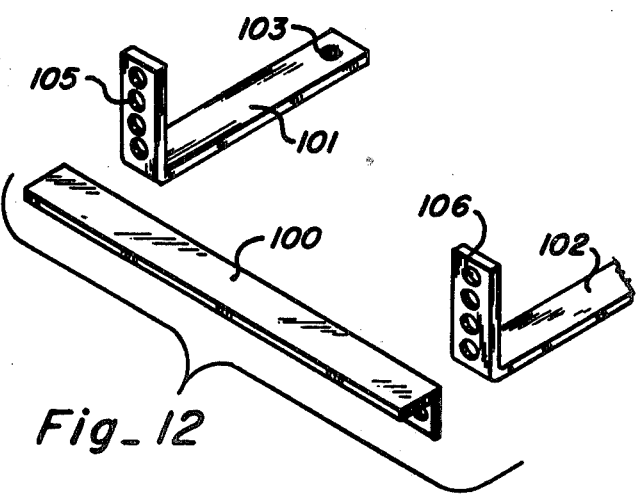
Fig_12
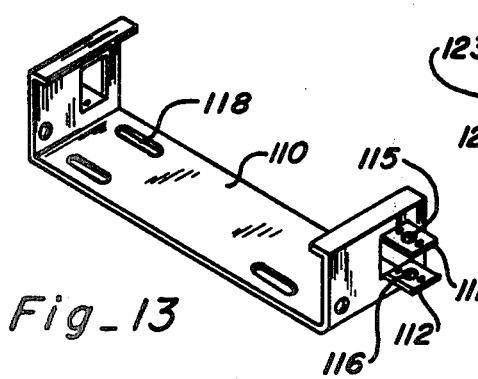
Fig_13
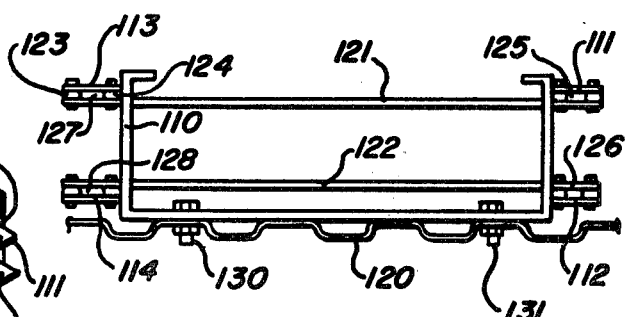
Fig_14

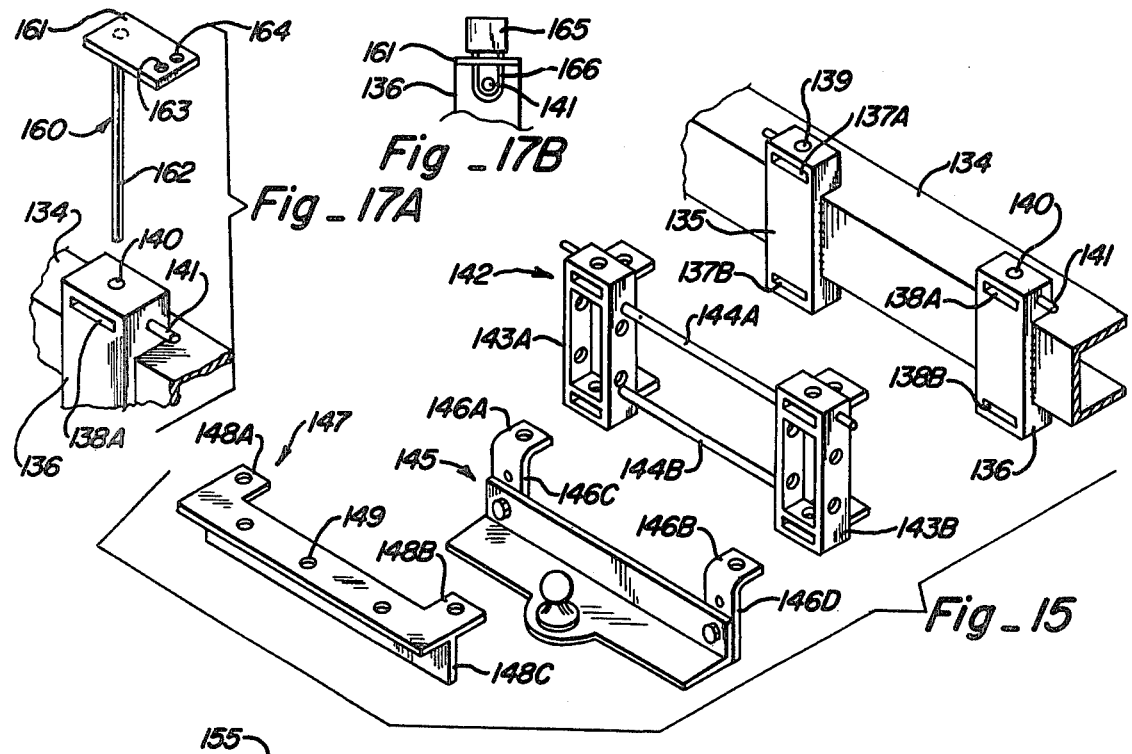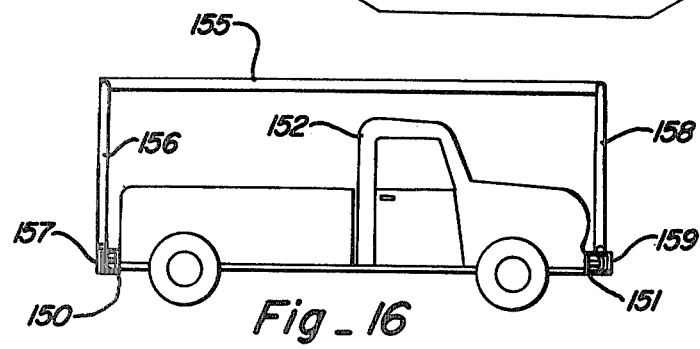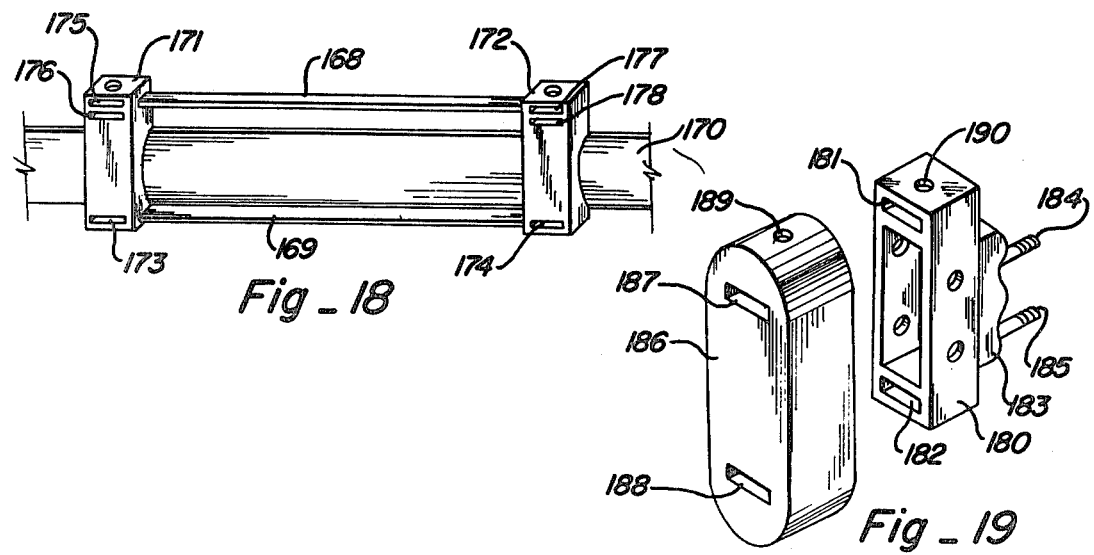

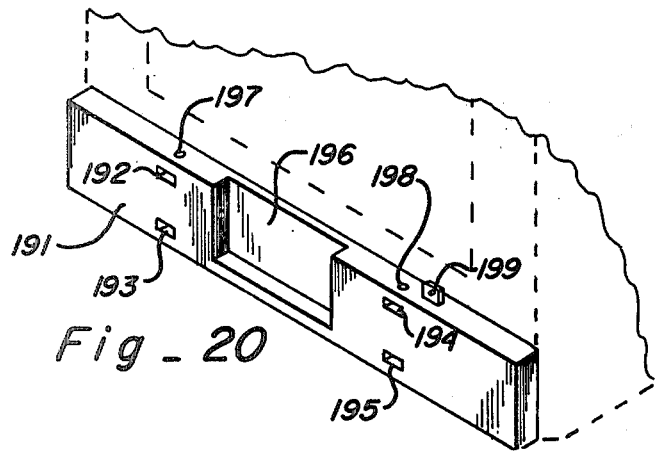

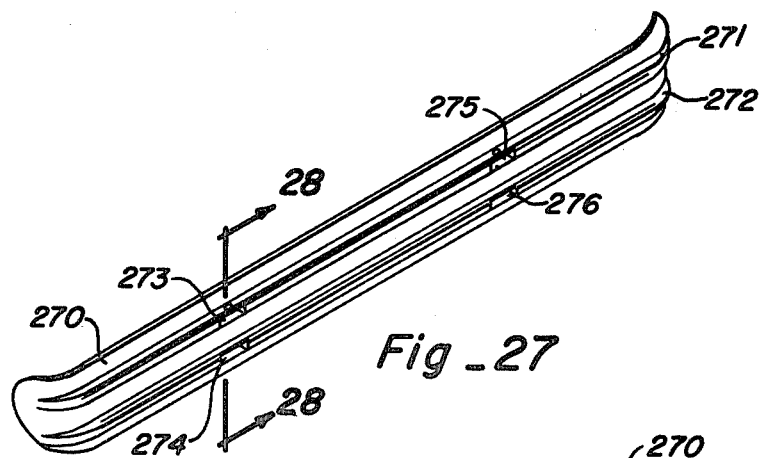
Fig_27
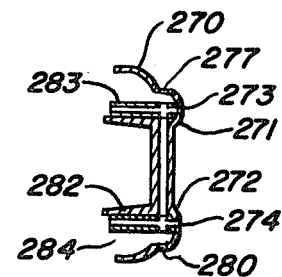
Fig_28
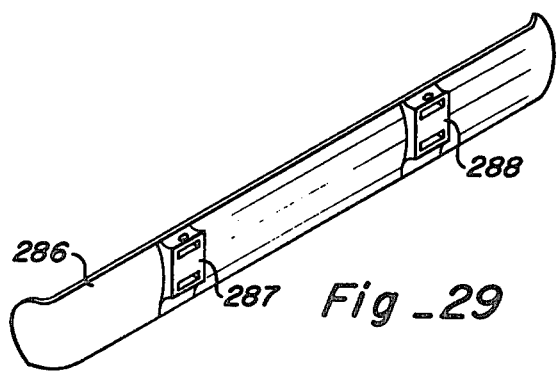
Fig_29

UNIVERSAL QUICK DETACH ACCESSORY MOUNT FOR VEHICLES OR THE LIKE

This application is a continuation of application Ser. No. 654,364 filed Feb. 2, 1976, now abandoned.

BACKGROUND OF THE INVENTION

This invention relates to apparatus and processes for removably attaching an accessory mounting adapter to a main structure. More particularly, the present invention relates to a mounting arrangement for retaining an accessory adapter on a vehicle so that the adapter is capable of accepting substantial loads when attached. The present invention is particularly useful as a universal accessory attachment to motor vehicles such as trucks, automobiles, vans, campers and the like wherein the adapter for attaching the accessories can be easily removed leaving the mounting framework so as not to interfere with the normal functions of the vehicle structure.

Various devices have been developed in the past for the purpose of permitting temporary attachment of accessories to motor vehicles and the like. Link and pin arrangements have been used where the attachment is for a separately wheeled vehicle as for obsolete railway car connections, farm vehicles and the like. Such loose attachment configurations are not suited for supporting the weight of the accessory and thus there have been some efforts to develop improvements along these lines. For instance, the Graybill et al U.S. Pat. No. 2,867,402 shows an arrangement for attaching a framework to the bumper of a motor vehicle. Such attachments are useful for relatively light loading purposes but the general structural weakness of vehicle bumpers frequently precludes their use for substantial loads. Accordingly, other devices have been developed for the purpose of transferring the load to the substantial vehicle frame members such as the outboard motor carrier shown in McCharen U.S. Pat. No. 2,592,050. Various other arrangements have been developed for attaching accessories to the vehicle frames particularly for trailer hitches and the like. Such devices require relatively permanent attachment to the vehicle frame and cannot be easily removed when not needed.

Accordingly, there have been further efforts to provide a removable carrier attachment for motor vehicles. For instance, U.S. Pat. No. 3,039,634 by Hobson et al suggests an arrangement for clamping tubular members to the underframe of an automobile and pinning an outboard motor carrier to the tubular members when it is needed. Yet another arrangement suggested for attaching a carrier for a motorbike or the like to a vehicle frame is shown by U.S. Pat. No. 3,796,333 by Goldstein wherein the trailer hitch of an existing mount is replaced by a pivotal bicycle or motorbike carrier structure.

The arrangements which permit detachment of the accessory from the vehicle with relative ease either require the continued extension of mounting members beyond the vehicle contours such as the trailer hitch of the Goldstein patent or apparatus which reduces the road clearance for the vehicle as with Hobson et al. Further, the list of items which it is desirable to attach to a vehicle from time to time challenges the imagination. For instance, special attachments have been provided for ball hitches, winches, towbars, snowplows, push bumpers, hoists, bike or motorcycle carriers, camping accessory carriers of all sorts, sports equipment carriers such as ski racks and so forth. Thus there has been a continuing need for an adapter attachment for a motor vehicle which can be easily changed so as to accommodate one or more of various accessories or accessory functions but can be removed in such a manner as to not impair the normal function of the vehicle body, the bumper in particular. The mounting arrangement for this adapter for many applications must be secured to the vehicle underframe with sufficient rigidity to accept substantial loads as in the case of towbars, ball hitches, winches and the like. Even further, the mounting framework for receiving the accessory adapter must be capable of accommodating a considerable variance in spacing as to major structural underframe members.

SUMMARY OF THE INVENTION

This invention is an apparatus and process for securely but removably attaching any of a wide variety of accessories to a main structural member such as a vehicle, building structure or the like. The invention finds its primary utility in securely but removably attaching vehicle accessories to a motor vehicle in a manner which permits accommodation of substantial loading by secure attachment to the chassis of the vehicle. An attachment frame is secured to the main structural elements of the vehicle and includes a plurality of attachment points, preferably at least four in number, which are arrayed in a generally rectangular box-like configuration. These attachment points are positioned for receiving a universal adapter which mounts the desired accessory or accessories.

In one embodiment, the attachment points are configured as slots which are oriented generally parallel to the anticipated direction of tension loading. The adapter includes appropriately positioned parallel extension arms which are dimensioned for insertion within appropriate slots of the mounting frame and apparatus is included for pinning the adapter thus inserted.

Adapters in accordance with this invention for releasably hitching accessory members to the frame of a vehicle, structure or the like can take a variety of forms. In one version, the adapter includes a pair of flat, solid, elongated arms of a preferably rectangular cross-section with these arms being rigidly interconnected in spaced but parallel and coextending relation to one another. These arms are adapted for releasable insertion in apertures of corresponding cross-section in the vehicle or structure frame. The security of the adapter attachment to the frame is enhanced by including a portion on the interconnection between the arms as via one section of an L-shaped member for abutting an external surface of the frame. In other forms, the adapter can include multiple flat arms somewhat similarly interconnected as mentioned above but with at least two of these arms being horizontally spaced and two of the arms being vertically spaced thereby being positioned at locations generally defining a geometric area. For instance, four such arms can be effectively positioned at teh four corners of a rectangular area. Although easily but securely attached adapters are obtained by using flat bars with generally rectangular cross-sections as are shown and described hereinbelow for some preferred embodiments, it will be recognized that the invention can be implemented with adapter prongs of other geometric cross-sections.

The attachment frame can be placed between the bumper of the vehicle and the vehicle underframe so as to permit removal of an adapter and still allow the vehicle bumper to provide its normal protective function. Still further, the mounting frame with the adapter removed does not substantially change the clearance dimensions of the vehicle yet provides an attachment of the adapter so as to be structurally sound both horizontally and vertically. This arrangement further permits a variety of accessories to be concurrently attached to the vehicle frame. Still further, the box-like attachment points can be included as part of an arrangement which can be attached on the flat bed of the vehicle as in the case of a pickup truck or the like. The novel box-like attachment point arrangement is particularly advantageous in that it can be directly incorporated as an integral part with otherwise conventional structural elements of existing vehicles or other structures. For instance, a heavy duty bumper of a pickup truck, four wheel drive vehicle or the like can be fabricated as original or replacement equipment with the attachment point frame effectively formed as an integral part thereof.

Another version of this invention employs a box-like frame which is rigidly attached to the vehicle underframe and which further has a multiplicity of lugs or ears affixed thereto. The adapter is attached by a hinged clamp which includes a plurality of offset bars or grips which are retained so as to slide into engagement with the frame lugs or ears. As with the aforementioned slot frame version, the offset ear arrangement can be mounted securely to a vehicle underframe between the bumper and the chassis so as to provide minimal additional clearance for the vehicle.

An object of this invention is to provide apparatus and processes for universal removable attachment to a main structure.

Another object of this invention is to provide apparatus and process for removably attaching a wide variety of devices to major structural elements such as a vehicle chassis or the like so as to accept substantial loading upon the attachment.

A still further object of this invention is to provide apparatus and process for effecting a universal attachment of one or more vehicle accessories to the vehicle in a manner which does not interfere with the intended functions of the vehicle elements when the accessories are not attached.

Yet another object of this invention is to provide an apparatus and process for accepting a universal accessory mounting adapter so as to be securely attached to the major structural elements of a vehicle in a manner which requires little or no modification of the vehicle structure.

A still further object of this invention is to provide apparatus and processes for accepting detachable attachment of a universal adapter to major structural elements so that the attached adapter is structurally sound and can be secured against pilferage.

The foregoing and other objects, features and advantages of the present invention will be more apparent in the light of the following description of exemplary preferred embodiments.

BRIEF DESCRIPTION OF THE DRAWINGS

FIG. 1 is a perspective view of the rear portion of a pickup truck with some elements broken away to show an attachment arrangement for an adapter mounting frame in accordance with one version of this invention.

FIG. 2 is a partially broken plan view of the FIG. 1 attachment arrangement.

FIGS. 3 and 4 show two additional potential versions of the attachment frame in accordance with one embodiment of this invention.

FIG. 5 is a perspective view of a mounting frame and a typical adapter therefor.

FIGS. 6–10 show several possible modifications of the present invention to provide securing against pilferage or unintended removal of an adapter.

FIG. 11 is an additional adapter for expanding the number of attachment adapters which can be inserted into the mounting frame.

FIG. 12 is a perspective view showing one possible arrangement for varying the vertical spacing of a crossbeam for an adapter.

FIGS. 13 and 14 illustrate a box mount frame for potential use on a flat bed.

FIG. 15 is a partially sectioned and broken view of a novel attachment arrangement incorporated as an integral part of a main structural element and further illustrating in assembly perspective an intermediate adapter and two separate accessory adapters.

FIG. 16 illustrates a potential attachment arrangements available through use of the present invention.

FIG. 17 shows an arrangement for securing and locking an attachment pin.

FIGS. 18, 19 and 20 show potential modifications to vehicle bumpers or bumper guards for incorporating the present invention.

FIG. 21 is a mounting frame in accordance with this invention which can be attached to the flat surface of a vehicle bumper.

FIG. 22 is an additional embodiment of the present invention employing a multiplicity of box-like spaced receiving ears and pivoted slide-on type of adapter.

FIGS. 23–26 illustrate yet another potential arrangement of the mounting ear embodiment which includes a slide-on type of adapter; and FIGS. 27–29 show potential arrangements for incorporating the present invention into vehicle bumpers in a more decorative arrangement.

DETAILED DESCRIPTION OF THE PREFERRED EMBODIMENTS

The primary utility for the present invention is envisioned in conjunction with motor vehicles and thus the preferred embodiments will be described in association with a pickup truck type of vehicle 10. Such vehicles typically include a major underframe for load bearing purposes as illustrated by beams 11 and 12 in FIGS. 1 and 2. One potential version of a mounting frame assembly 15 is shown in FIGS. 1 and 2 rigidly attached between bumper extension beams 16 and 17. That is, vehicles such as 10 typically include an extension plate or beam from each major structural underframe member for mounting of the bumper 18. In many instances, it is expected that somewhat longer and possibly stronger beams such as shown at 16 and 17 can directly replace the bumper plate so as to accommodate additional rearward clearance for assembly 15 yet still mount bumper 18 so that it will continue providing its intended protective function.

The purpose of frame assembly 15 is to provide four spaced rectangular slots 20–23 in a sturdy box-like open rectangular configuration as can be seen in FIGS. 1 and 2. Slots 20–23 are formed between U-shaped bracket members 24 and 25 along with cross plates 26 and 27. In the FIGS. 1 and 2 embodiment, the slots are formed by attaching small crossbars such as 28 and 29 for slot 20 and bars 30 and 31 for defining slot 21 to the cross plates 26 and 27, preferably by welding.

By way of example, U-brackets 24 and 25 as well as plates 26 and 27 can be typically of one-half by two inch hot-rolled steel. Bars 28–31 as well as their counterparts for slots 22 and 23 might typically be also one-half inch thick cold-rolled steel welded to one side and at respective ends of plate 26 so as to define slots 20 and 21 at one-half inch high by slightly over two inches wide. By bolting the bar 26 to the upper arms of brackets 24 and 25 as shown, the slots will be enclosed and of a depth of the width of members 24–26 (i.e.: two inches, for example) thereby defining chamber-like passageways.

Accordingly, uniformly spaced slots 20–23 are retained in the box-like configuration with a sturdy interconnection therebetween so as to accept both vertical and horizontal loading relative to the slots. Further, the arrangement for bolting brackets 24 and 25 between plates 26 and 27 can accommodate differing spacings between vehicle underframe members 11 and 12 such as by employing additional spacers between brackets 24 and 16 as well as 25 and 17. Further, brackets 24 and 25 can be oppositely oriented from that shown in FIGS. 1 and 2 to accommodate relatively narrow spacings between vehicle underframes and adjustable bolt slots or a series of spaced bolt holes could even be included in members 24 and 25 for their attachment to plates 26 and 27 if desired. That is, the bumper brackets such as 16 and 17 can be positioned on either side of U-members 24 and 25 and U-members 24 and 25 can be inverted from that shown. Additionally, spacers can be used between bumper brackets 16 and 17 and U-members 24 and 25 to reduce the number of bumper bracket shapes to accommodate a large variety of vehicles. Although it has been generally found to be preferable to use box-like or rectangular slots 20–23, any hole pattern can be used such as round slots or the like.

In the event that an adjustable width is not required or that additional spacers can accommodate varying widths, the mounting frame for slots 20–23 can be relatively rigid. FIGS. 3–5 illustrate additional potential arrangements for accommodating such slots. In FIG. 3, a box shaped main frame 35 is formed by stamping and brackets 36–39 are attached thereto as shown, preferably by welding. An exceptionally strong frame is shown in the FIG. 4 embodiment which employs a main I-beam structure 40 which has tabs on each end such as 41 bent to accommodate the attachment to the frame and slot-defining boxes 42–45 welded along the upper and lower flanges as shown. Note that the slot-defining assemblies in accordance with this invention can be as easily accommodated by the front of a vehicle as by the rear.

FIG. 5 shows a perspective view of a closed rectangular box frame 46 which has slot-defining brackets 47–50 welded thereto as shown. A hole included in each slot bracket (such as hole 51 for bracket 47) aligns with an underlying hole through upper frame member 52 and further aligns with a hole 53 through lower frame member 54 and hole 55 in lower bracket 49. Thus, pins such as 56 and 57 can be used to secure an accessory adapter such as 58. As illustrated in FIG. 5, the accessory adapter 58 includes a main crossbar 59 to which are attached four extension arms or prongs 60–63 which align with the slots defined by brackets 47–50 in assembly 46. Thus holes 64 and 65, when assembly 58 is inserted into the slots for brackets 47–50 align with the holes in the mounting frame assembly such as holes 51, 53, and 55 so as to accept passage of pin 56 therethrough to securely complete the attachment of the adapter which is shown as including a ball hitch arrangement 66. Note that by proper alignment of the extension arms 60–63 for adapter 58, it could be as well attached to the slots of mounting assemblies shown in FIGS. 1–4 as it could be for FIG. 5. Note further that four separate pins could be used instead of pins 56 and 57 if this should be dedesirable. The alignment of the holes through the extension arms of adapter 58 and the holes in the mounting frame can be further facilitated by including stop bars such as are shown in phantom at 67 and 68.

The apparatus for securing the adapter in the mounting frame preferably should include some means for locking the adapter in place to diminish the possibility of its theft or accidental dislodging. Although holes through the bottom of one or more of pins such as 56 and 57 could be included for placement of a lock, such an arrangement will generally be inconvenient since it would require the lock to be positioned below the frame or that the pins be inserted from the bottom. However, a variety of locking arrangements is possible in conjunction with the present invention. For instance, FIG. 6 illustrates one potential arrangement wherein a portion of a mounting frame 70 which might be similar to the mounting frame shown in FIGS. 1–5 includes a slot-defining box 71 and an offset shoulder 72 which has a bore 73 therethrough. FIG. 7 illustrates a pin 75 arranged to cooperate with the apparatus shown in FIG. 6 for providing this locking configuration. More particularly, the shank 76 of pin 75 is inserted through the hole 74 as well as the other aligning holes and the bent portion of pin 75 has a flattened shoulder 77 through which is a bore 78 for alignment with hole 73 in tab 72. Thus an adapter such as 58 in FIG. 5 can be inserted into the slot and aligned with the holes 74, pin 75 inserted through the aligned holes so that the bores 73 and 78 are in alignment and a lock passed through holes 73 and 78 thereby insuring that the adapter cannot be easily removed.

FIG. 8 shows another potential pin 80 which could be used in conjunction with the FIG. 6 apparatus. The pin 80 has a flat head portion 81 attached thereto which has one end bent so that hole 82 can be aligned with hole 73 when pin 80 is inserted into the mounting frame. As with pin 75 of FIG. 7, pin 80 can then accept a lock or non-locking retainer through the aligned holes 82 and 73.

FIG. 9 shows yet another potential modification of the invention to include a locking device. More particularly, a portion of a box mounting frame 84 is shown with one of the slot-defining boxes 85 attached thereto with a shoulder plate 86 attached perpendicular to the side of box 85 and also the upper surface of frame 84. By fabricating a bent pin 88 as shown in FIG. 10 with a flat forged end surface 89, hole 90 therethrough can be arranged to align with hole 87 of pate 86 when pin 88 is inserted into the slot box 85. Such an arrangement facilitates the placement of a lock through the aligned holes 87 and 90 and further strengthens the shoulder plate 86. By use of hardened steel for the pin such as 88, the secured adapter attachment is then difficult to remove. Generally inclusion of a single lock pin and shoulder arrangement for each mounting frame should be sufficient for security purposes.

The four square holes or slots in the mounting frame in accordance with this invention can also be used simultaneously for different applications. Referring again to FIGS. 1 and 2 by way of example, the two lower holes 22 and 23 can be used for a trailer hitch while the two upper holes 20 and 21 might be mounting a bike carrier, spare tire carrier, gas can carrier, part of an overhead boat carrier or the like. Further, extenders can likewise amplify the applications for the invention. One example of a double extender is shown in FIG. 11 wherein a solid tongue 94 is attached to an extender frame 96 and includes a hole 95 for aligning with the holes through the slots of the mounting frame. Although FIG. 11 illustrates the extender as including two additional rectangular slots 97 and 98, it will be recognized that such an extender can be used for a single slot or for greater numbers of slots. As a single slot extender, the device permits the positioning of the adapter attachment further from the vehicle body. A combination of two double slot extenders such as that shown in FIG. 11 and two single slot extenders can permit the attachment of heavy duty adapters as might be required for winches, heavy load trailer hitches and the like while still making available an additional pair of square slots for mounting other lighter load bearing adapters such as for bike carriers, spare tire carriers, etc. Locking tabs similar to those shown previously in FIGS. 6–10 can likewise be included as desired.

The adapters in accordance with the present invention can be made adjustable for height. For instance, FIG. 12 illustrates a two-prong adapter which includes a main cross member 100 and two side prongs 101 and 102. Each of the side prongs 101 and 102 has a hole through one end thereof such as 103 which is arranged for alignment with the holes through the rectangular slots of the mounting frames. Further, the side prongs 101 and 102 include a plurality of spaced mounting holes 105 and 106 to which cross beam 100 can be attached for the desired selectable height. Such an arrangement is particularly advantageous whenever the adapter is required for trailer hitches which have different attachment heights. Although the FIG. 12 arrangement illustrates an upward extending adjustable height arrangement, clearly the apparatus can be inverted if lower adjustments are required. In any event, the resulting assembly of an adapter in accordance with FIG. 12 is a two-prong adapter which can mate with the upper or lower pairs of rectangular slots for the mounting frame.

Occasionally, it is preferable to mount an accessory within the bed of a vehicle, a particular example being for winches. FIGS. 13 and 14 illustrate an arrangement for such an attachment. The particular advantage of the arrangement shown in FIGS. 13–14 is that permanent intrusions into the vehicle bed space are not required so that the mounting frame can be removed when not needed and the vehicle available as previously. More particularly, FIG. 13 shows the basic box-like frame 110 which can be stamped or otherwise formed from a single piece of sheet steel. Each side of the base frame 110 has two ears extending therefrom, 111 and 112 on one side and 113 and 114 on the other. These ears have a pair of bolt holes therethrough and a central hole such as 115 and 116 for ears 111 and 112, respectively, for accommodating the attachment pin as has been discussed previously for the other slot boxes. The lower surface of base frame 110 also includes a plurality of slots such as 118 to accommodate attachment to the vehicle bed.

FIG. 14 illustrates the completed box frame assembly attached to a vehicle bed 120. A pair of flat cross bars 121 and 122 each have a pair of smaller cross bars such as 123 attached to the ends thereof. Thus by bolting the short cross bars such as 123 and 124 to the ears 111–114 as shown in FIG. 14, a plurality of spaced rectangular slots 125–128 are formed in substantially the same rigid interconnected relationship as has been previously described for the other mounting frame arrangements. Since many vehicles such as pickup truck beds are corrugated, the slotted holes such as 118 in the bottom of base frame 110 can be included for accommodating mounting bolts such as 130 and 131 shown in FIG. 14.

FIG. 15 is a perspective assembly type drawing which illustrates several features of this invention. More particularly, a broken section view is presented of a portion of a vehicle bumper 134 somewhat similar to those found on conventional pickup trucks, four wheel drive vehicles, vans and the like. Such bumpers 134 are generally of sufficient strength and rigid attachment to the vehicle frame to accept substantial loads. A pair of box-like members 135 and 136 are welded, integrally formed with or otherwise securely attached to bumper 134 and include respective slot pairs 137 and 138 and vertical posts 139 and 140 in a configuration substantially as described hereinbefore. Member 136 is shown with a horizontal post 141 for locking purposes as will be described for FIG. 17. An intermediate attachment assembly 142 composed of a pair of slot box members 143 interconnected by a pair of cross bars 144. Intermediate assembly 142 is attachable in slots 137 and 138 and is particularly useful for such purposes as extending the point of attachment for other accessories from the main structure or vehicle. Two examples of accessory attachments are shown in FIG. 15 in the form of trailer hitch assembly 145 via curved lugs 146 and an L-shaped member 147 via lugs 148. Member 147 as shown includes a series of holes therethrough as at 149 for any desired purposes such as for additional cargo accommodation, guy wire attachment, etc. Note that adapters 145 and 147 each are formed with a portion perpendicular to the solid elongated flat attachment bars. This is shown in FIG. 15 as segments 146C and 146D for adapter 145 and as downwardly depending flange 148C for adapter 147. These perpendicular portions of the interconnection between the attachment arms are adapted to abut the external surface of the vehicle attachment assemblies so as to enhance the strength of the adapter as attached to the vehicle frame particularly for withstanding load forces in a generally vertical direction. Obviously the vertical security can be further enhanced by including additional but oppositely directed perpendicular plate segments. That is, segments 146C and 146D could be extended upwardly beyond attachment portions 146A and 146B for adapter 145 whereas an additional but upwardly depending flange similar to 148C could be included in adapter 147.

Although multiple prong adapters have been shown and described in detail herein, it will be readily apparent that a single prong adapter which fits any one of the slots such as 137A, 137B, 138A or 138B can be used. For instance, a single prong with a hole through one end for pinning within one of slots 137 or 138 could include a simple accessory attachment on the other end. Examples of such simple attachments could include a trailer hitch, an eyelet for a tow cable, and so forth. Still further, a two-prong adapter arranged to mate with two vertically oriented slots such as 137A and 137B could be used for such purposes as attaching flag or antenna posts and the like.

FIG. 16 shows one combination of use of the adapters for providing a rack on which ladders, boats, lumber and the like can be placed. This particular application employs two rectangular mounting frames 150 and 151 at the front and rear of the vehicle 152. The mounting assembly 155 for retaining the cargo has one upward extending arm or pair of spaced arms 156 attached to a four-prong adapter 157 while the other upright section 158 is attached to a four-prong adapter 159 at the front of the vehicle. Each of the adapters 157 and 159 can be generally of the configuration suggested in FIG. 5 except that the uprights are rigidly attached along the upper portion thereof.

FIGS. 17A and 17B show an additional arrangement wherein the vehicle accessory attachments can be pinned and locked in place relative to slot-box member 136. In FIG. 17A, a pin assembly 160 comprised of flat head plate 161 and elongated shaft 162 firmly secured as a downward extension of plate 161, is shown in proper relation for insertion through the port 140 thereby retaining the adapter lugs in place in the slots 138. Plate 161 has a pair of holes 163 and 164 therethrough. With assembly 160 fully in place as shown in the broken side view of FIG. 17B, shank 166 of a padlock 165 is fed downward through one of holes 163 or 164, pivoted around post 141 and fed upwardly through the other of holes 163 or 164. Lock 165 can then be secured in a conventional manner to prevent theft or unintended loss of the adapter. Note that the locking arrangement can likewise be provided by replacing rod or post 141 with another flat plate extending from slot-box 136. A hole in this additional plate and a hole through plate 161 (which could actually be one of holes 163 and 164) can then be aligned with one another to accept shank 166 of lock 165, a cotter pin or other securing device.

The arrangement for attachment of the square holes or slots can also be incorporated into a vehicle somewhat in the manner of bumper guards as is shown in FIGS. 18 and 19. In this embodiment, bumper 170 has two relatively rigid mounting frames 171 and 172 attached somewhat in the manner of a bumper or grille guard. The slot frames 171 and 172 are interconnected via attached braces 168 and 169 and are secured through bumper 170 to the vehicle frame in a rigid manner so as to effectively provide a mounting platform for adapters in accordance with the invention. Each of these guards 171 and 172 is illustrated as including a single lower slot 173 and 174 and pairs of upper slots 175-178. Accordingly, the bumper guards as shown in FIG. 18 can accommodate a single four-prong adapter as is shown in FIG. 5 in slots 173, 174, 176 and 178 while concurrently accommodating a double-prong adapter such as the FIG. 12 or 15 arrangements in slots 175 and 177. Further, the grille guards 171 and 172 can be made relatively attractive by a panel-like slip-on cover revealing its utility only by the appearance of the necessary apertures in the front which can be blanked by decorative inserts when not in use if desired. Note that braces 168 and 169 can be omitted entirely if bumper 170 is sufficiently strong to maintain proper slot spacing tolerance and anticipated loads on the mechanisms.

FIG. 19 shows an example of a grill guard slot frame 180 which can be made of solid metal (cast, wrought, scintered or otherwise) and which includes a single pair of slots 181 and 182. An integral part of slot frame 180 is a bumper contour matching adapter 183 which could be of pliable material in some cases or could be formed as an integral extension of frame 180. However, affixed to frame 180 are mounting bolts 184 and 185 for rigid attachment to the underframe of the vehicle via a bumper extension type of plate. A decorative escutcheon 186 can be included to cover the load bearing member 180 with external slots 187 and 188 for alignment with slots 181 and 182 and further with a pin slot 189 which passes completely through member 186. That is, bolt hole or pin hole 189 is arranged to align with pin holes 190 of member 180 and thus accommodate the locking pin. If braces similar to 168 and 169 of FIG. 18 are included, the cover 186 can accommodate them by appropriately positioned side slots.

Some vehicles are already equipped with relatively strong bumpers and can be even more easily adapted for inclusion of the present invention. A common example is the stepped-type bumper frequently included on pickup trucks and other vehicles which anticipate heavy duty usage. If such frame-type bumpers are too narrow to accommodate slots, slot boxes can be attached to the upper and/or lower surfaces of the bumper and include spacing adapters if necessary. In other cases, some or all of the apertures may be positionable within the vertical space of the bumper such as is illustrated in FIG. 20. As shown in FIG. 20 and in contrast to FIG. 15, the relatively solid bumper 191 is assumed to have sufficient vertical height to accommodate the adapter mounting slots 192-195 on either side of the license plate recess 196. Vertical bores 197 and 198 pass completely through the inner sidewalls of slots 192-195 for accommodating the fastening pin as mentioned previously. In addition, a locking tab 199 can be included for the same purpose as described previously.

FIG. 21 shows yet another version which permits application of an adapter mounting frame 200 in the event that it is desired not to modify the vehicle bumper or if the vehicle is not equipped with a standard bumper but a pair of spaced rear plates as are used in some recreational type vehicle. The basic slot defining frame 200 can be substantially in accordance with any of the various embodiments previously described but further including additional shoulders 201 (not visible on left side) and 202 for attachment to the bumper or other portion of the vehicle. Otherwise, the frame 200 can be fabricated substantially in accordance with any of the previously mentioned configurations.

It should be noted that FIG. 21 does illustrate one further potential modification for the slot-defining frames in that the slots are formed by four assemblies 204-207 which are rigidly attached so as to extend upwardly and downwardly from cross bars 208 and 209, respectively. Such a configuration enjoys the advantage of having minimal structure appearing above and below the edge of a vehicle bumper while still providing the rigid interconnection of the box-like slot arrangement.

FIG. 22 shows another embodiment for effecting an adapter attachment for a motor vehicle or the like in accordance with this invention. Mounting frame 210 is attached by means not shown to the underframe of the vehicle such as by the adapter plate arrangements discussed previously. Four lugs 211-214 are welded transversely across the upper and lower surfaces of the frame 210 so as to protrude from the front and rear thereof. The adapter assembly 215 is shown in perspective view relative to the mounting frame 210 and includes lower arm assemblies 216 and 217 which are interconnected via bar 223 and pivotally attached to bar 218. At the extremity of each of assemblies 216 and 217 and also upper arm assemblies 219 and 220 are a plurality of offset lug arrangements such as 221 which are adapted for clamping around the upper and lower surfaces of frame 210 and thereafter being slid under the protruding extensions of lugs 211-214. The particular accessory which is to be attached can then be mounted such as to cross bar 222 and/or 218.

A somewhat similar arrangement is shown in FIG. 23 wherein box-like main mounting frame 225 is rigidly attached or secured to the vehicle underframe as previously mentioned. This frame has four lugs 226-229 attached to one side and four additional lugs 230-233 attached to the other side such as by welding. A stop bar 234 can also be included on the upper and/or lower surface if desired.

The adapter attachment for the frame 225 is shown in side view in FIG. 24. In a manner somewhat similar to the FIG. 22 arrangement, upper and lower arm assemblies 240 and 241 are pivotally interconnected at pin connection 242 and include a pair of extension arms which are arranged as shown at 243 and 244 in FIG. 24 so that the arms 240 and 241 can be clamped around box frame 225 and the J-shaped end of arms 243 and 244 slid over the ears or lugs 226-233. Note that the configuration shown in FIG. 24 is such that it can be placed around bumper 245 so that the box frame 225 is not visible when the adapter assembly 239 is removed.

FIGS. 25 and 26 illustrate a frame arrangement which can be attached to the clamp assemblies shown as adapters 215 and 239 for FIGS. 22 and 24. That is, the back frame 250 has a plurality of J-shaped ears 251-254 which can fit over the cross bars and rods such as 242 and 246 in FIG. 24 or 218 and 222 in FIG. 22. A bracket latch 255 shown in FIG. 26 can then fit between the member 250 and assembly 215 or assembly 239, with slots 260 and 261 over guide pins 258 and 259. The assembly can then be slid laterally so that arms 264 and 265 are positioned under the lower edges of retaining lugs on assemblies 215 or 239 such as lugs 266 or 267. The locking holes 256 and 257 align thereby permitting further securing of the attachment by inserting a lock through apertures 256 and 257.

Yet another advantage of the slot mounting embodiment of this invention is that it can be formed directly into a vehicle bumper without significantly detracting from its decorative quality. Some examples of this are shown in FIGS. 27-29. In FIG. 27, bumper 270 which is formed with raised lateral ridges 271 and 272 which have four slots 273-276 oriented at the corners of a rectangular quadrant. A section view along line 28—28 of FIG. 27 is shown in FIG. 28 wherein channel frame 282 has slot boxes 283 and 284 welded thereto with attachment pin holes aligned from upper bore 277 to lower bore 280 through holes in boxes 283 and 284. Another arrangement along these lines is shown in FIG. 29 for bumper 286 which has two slot frames 287 and 288 formed integrally therewith.

Note that the various attachment embodiments shown and described above can be used for any type of vehicle whether it be a large utility truck, earth-moving machinery or can also be applied to some fixed applications such as on shop walls for use as a removable hoist attachment and the like. Although two and four prong adapters have been shown in the foregoing embodiments, it should be appreciated that any arrangement of one or more prongs can be used as the application dictates. In general, the greater the lateral and vertical loading anticipated in conjunction with attachment of a particular accessory, the more prongs should be employed in the actual adapter.

Although the present invention has been described with particularity with respect to the detailed description of the foregoing exemplary preferred embodiments, various other modifications, changes, applications and additions will be readily apparent to those having normal skill in the art without departing from the spirit of the invention.

What is claimed is:

1. Hitch apparatus adapted for removable mounting an article to be towed to the underframe of a vehicle and the like, comprising:

a male adapter affixed to said article, said male adapter including a plurality of interconnected arms projecting in a common direction in spaced substantially parallel relation to one another and each arm terminating in a solid flat tongue portion at its outer free end, said arms being connected at the other end in rigid relation to one another and at least two of said arms being in substantially vertical orientation to one another;

a pair of rigid brackets mounted to said underframe and projecting outwardly therefrom in spaced-apart relation to one another;

female interconnecting means mounted on said rigid brackets for interconnecting said male adapter to said underframe, said female interconnecting means having upper and lower substantially horizontal slotted passageways aligned for simultaneously receiving the tongue portions of said arms in mating relation to one another, each of said slotted passageways having upper and lower walls spaced apart a distance for close-fitting insertion of its respective tongue portion and elongated in the direction of insertion of said tongue portion thereinto, said female interconnecting means having a pair of elongated parallel spaced-apart wall portions attached to said brackets and each said wall portion defining one of said upper and lower walls of each said slotted passageway; and releasable attachment means for positively coupling said arms within said slotted passageways, said releasable attachment means extending through slotted passageways in a direction transversely of the direction of extension of said arms into said slotted passageways and extending through openings in said arms so as to be operative when attached to transfer the load forces between said adapter and said female interconnecting means to said underframe.

2. Apparatus in accordance with claim 1 wherein said arms are defined by a plurality of adapter prongs extending in a common direction from a common frame, said slotted passageways each being of generally rectangular cross-sectional configuration corresponding to the cross-sectional configuration corresponding to the cross-sectional configuration of the flat tongue portions of said arms, each slotted passageway having a rectangular external opening, said opening being longer in a horizontal direction than in a vertical direction.

3. Apparatus in accordance with claim 2, said adapter prongs being of a generally flattened configuration each having a hole extending tranversely therethrough, each said slotted passageways having holes through its respective said upper and lower walls for alignable registering with said hole of an associated adapter prong when the adapter prong is inserted into said passageway, and including releasable attachment means including a plurality of rods each adapted for passing through said passageway holes and the aligned hole of an adapter prong for a respective said passageway.

4. Apparatus in accordance with claim 2 for use in connection with a vehicle having at least two bumper mounting plates extending from the underframe of the vehicle, said bumper mounting plates defining said brackets, said female interconnecting means including a pair of slot-defining brackets each having at least two of said slotted passageways extending in spaced relation to one another, said slot-defining brackets each having bolt means affixed thereto for attachment to a respective bumper mounting plate.

5. Apparatus in accordance with claim 4 wherein said bolt means are arranged to retain slot-defining brackets in perpendicular relation to the exterior surface of the bumper.

6. Apparatus in accordance with claim 2 for use with a vehicle having a bumper for attachment to said rigid brackets extending from the vehicle underframe wherein said female interconnecting means is rigidly attached between the rigid brackets and between the bumper and the vehicle underframe, said female interconnecting means does not interfere with the normal protective functioning of the bumper when an adapter is not secured to said female interconnecting means.

7. In a hitch apparatus adapted for removable mounting an adapter to the underframe of a vehicle wherein said adapter includes a plurality of elongated arms terminating in relatively flat, wide connecting solid end portions extending in a common direction away from a common interconnecting frame, said arms projecting in spaced substantially parallel relation to one another in over-and-under configuration, the combination therewith comprising:

a support frame assembly being rigidly attached to said underframe, said frame assembly having first and second elongated flat brace members and provided with at least two pairs of upper and lower female interconnecting means extending in a common direction through said frame assembly from an exterior surface thereof in facing relation to said arms, said female interconnecting means including slots aligned for insertion of the connecting end portions of said arms with said female interconnecting means being rigidly attached to the underframe, said slots forming a plurality of internal passageways each having upper and lower walls dimensioned for close fitting reception of a respective one of said solid end portions therebetween, one of said upper and lower walls of each said internal passageway being defined by one of said first and second brace members; and releasable attachment means for positively coupling said arms within said slots, said releasable attachment means extending through holes in said slots and said solid end portions.

8. Apparatus in accordance with claim 7 wherein the adapter arms each include an opening extending transversely therethrough, said frame assembly including bores extending therethrough into communication with said internal passageways for alignment with the transverse openings of said adapter arms when inserted in said internal passageways, said releasable attachment means including a plurality of pins each adapted for insertion through respective aligned bores and adapter arm openings.

9. Apparatus in accordance with claim 8 wherein said frame assembly includes a pair of brackets each having a central portion and two arms extending therefrom in a U-shaped configuration with the ends of said brace members being interconnected by respective said arms of said brackets to define said internal passageways at each end of said frame assembly, said brackets being rigidly attached in proximity to the ends of said brace members and said frame assembly being of generally open rectangular configuration.

10. Apparatus in accordance with claim 7 wherein the interconnection between said bracket arms and said brace members includes means for laterally adjusting the interconnection therebetween to vary the spacing between said pairs of said slots at opposite ends of said frame assembly.

11. In a hitch apparatus according to claim 7 wherein the other of said upper and lower walls of each said internal passageway being formed by flat, horizontal portion of said bumper.

12. An adapter for releasably hitching an accessory member to a vehicle frame, said adapter comprising at least two pairs of adapter arms of generally rectangular cross-section interconnected at one end in rigid, spaced and parallel relation to one another, and projecting in a common direction to terminate in flat tongue portions at their opposite free ends, each of said adapter arms being in the form of a flat solid elongated bar, and each of said pairs being formed as the outer portions of a U-shaped assembly, said U-shaped assemblies being rigidly interconnected so that said arms are positioned at the corners of a rectangular configuration, said bars being coextensive and adapted for releasable insertion in apertures of cross-sectional configuration corresponding to said bars and said bars are provided with openings at their free end adapter to receive connecting pins for releasable interconnection of said bars to the vehicle frame.

* * * * *

UNITED STATES PATENT AND TRADEMARK OFFICE
CERTIFICATE OF CORRECTION

PATENT NO. : 4,204,702

DATED : May 27, 1980

INVENTOR(S) : Victor C. Oltrogge

It is certified that error appears in the above—identified patent and that said Letters Patent is hereby corrected as shown below:

On the Title Page, in the listing of the number of Drawing Figures, cancel "30" and substitute -- 29 --.

Column 2, line 61, cancel "teh" and substitute -- the --.
Column 4, line 27, cancel "arrangements" and substitute -- arrangement --.
Column 4, line 67, after "box-like" insert -- , --.
Column 6, line 13, cancel "dedesirable" and substitute -- desirable --.
Column 10, line 43, cancel "vehicle" and substitute -- vehicles --.

In The Claims:
Claim 1, Column 12, line 15, cancel "removable" and substitute -- removably --.
Claim 2, Column 12, line 61, cancel "corresponding to the".
Claim 2, Column 12, line 62, cancel "cross-sectional configuration".

UNITED STATES PATENT AND TRADEMARK OFFICE
CERTIFICATE OF CORRECTION

PATENT NO. : 4,204,702
DATED : May 27, 1980
INVENTOR(S) : Victor C. Oltrogge

It is certified that error appears in the above—identified patent and that said Letters Patent is hereby corrected as shown below:

Claim 3, Column 13, line 1, cancel "passageways" and substitute -- passageway --.
Claim 5, Column 13, line 20, after "retain" insert -- said --.
Claim 7, Column 13, line 32, cancel "removable" and substitute -- removably --.

Signed and Sealed this

Twentieth Day of October 1981

[SEAL]

Attest:

GERALD J. MOSSINGHOFF

Attesting Officer    Commissioner of Patents and Trademarks